(12) United States Patent
Wang et al.

(10) Patent No.: US 7,869,933 B2
(45) Date of Patent: Jan. 11, 2011

(54) TEMPERATURE SENSING COORDINATION WITH ENGINE VALVE TIMING USING ELECTRIC VALVE ACTUATOR

(75) Inventors: Yan Wang, Ann Arbor, MI (US); Alex O'Connor Gibson, Ann Arbor, MI (US); Vladimir V. Kokotovic, Bloomfield Hills, MI (US); Allan Roy Gale, Livonia, MI (US); Philip Thomas Koneda, Novi, MI (US); Allan Joseph Kotwicki, Williamsburg, MI (US); Marvin Paul Kraska, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 496 days.

(21) Appl. No.: 12/057,764

(22) Filed: Mar. 28, 2008

(65) Prior Publication Data

US 2009/0241872 A1    Oct. 1, 2009

(51) Int. Cl.
*G06F 19/00* (2006.01)
*F01L 9/04* (2006.01)
*F16K 3/02* (2006.01)
*H01H 47/02* (2006.01)

(52) U.S. Cl. .................... 701/114; 123/90.11; 701/103; 251/129.15; 361/152

(58) Field of Classification Search ............. 123/90.11, 123/90.15–90.18, 90.31, 490, 568.21; 701/101–104, 701/114; 251/129.01, 129.05, 129.09, 129.1, 251/129.15, 129.16; 361/152, 159, 187
See application file for complete search history.

(56) References Cited

U.S. PATENT DOCUMENTS

| 4,065,096 | A | * | 12/1977 | Frantz et al. | ............. 251/129.1 |
| 6,102,364 | A | * | 8/2000 | Busato | ................. 251/129.05 |
| 6,310,754 | B1 | * | 10/2001 | Busato | ...................... 361/187 |
| 6,390,038 | B1 | | 5/2002 | Di Lieto et al. | |
| 6,758,176 | B2 | | 7/2004 | Wada et al. | |
| 6,957,635 | B2 | * | 10/2005 | Katayama | ................ 123/90.17 |
| 7,165,518 | B2 | * | 1/2007 | Ervin et al. | ............. 123/90.11 |
| 7,204,210 | B2 | * | 4/2007 | Ervin et al. | ............. 123/90.11 |
| 7,600,494 | B2 | * | 10/2009 | Gale et al. | ............... 123/90.11 |

* cited by examiner

*Primary Examiner*—Willis R Wolfe, Jr.
(74) *Attorney, Agent, or Firm*—Allan J. Lippa; Alleman Hall McCoy Russell & Tuttle LLP

(57) ABSTRACT

A method of operation for an engine including an electrically actuated engine valve in a cylinder head, with at least an actuator coupled to the valve, the method including applying a potential to generate a current indicative of temperature in the actuator at least partially during a substantially non-moving condition of the actuator and adjusting a timing of the application of the potential based on valve location in the cylinder head.

20 Claims, 10 Drawing Sheets

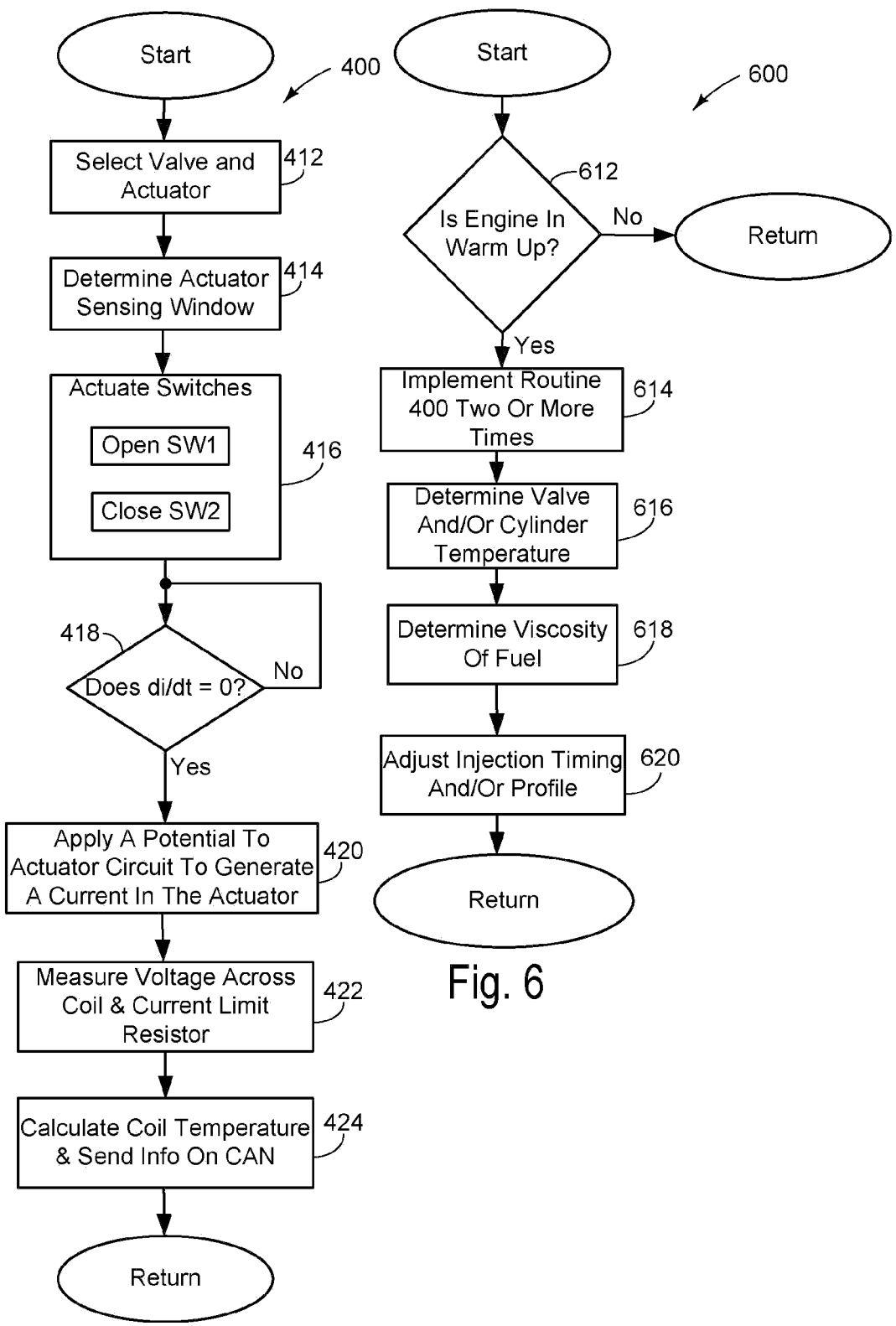

TEMPERATURE SENSING COORDINATION WITH ENGINE VALVE TIMING USING ELECTRIC VALVE ACTUATOR

BACKGROUND AND SUMMARY

One approach to identifying valve temperature may be to sense temperature via an electric valve actuator, where the actuator coil resistance is correlated to temperature. In one approach, when the valve is in an un-actuated state, a current is passed through the coil that is too small to cause the valve to move, but large enough to provide a corresponding voltage indicative of the coil resistance. Likewise, the current applied to hold a valve open/closed may also be correlated to resistance. The identified resistance can then be correlated to temperature.

However, the inventors herein have recognized a potential disadvantage with such an approach. Specifically, such temperature sensing is typically needed at a significantly slower sampling rate than intake/exhaust valve cycling driven by engine firing and the firing order. In other words, taking a reading at every un-actuated valve position may be too cumbersome and increase chronometric loading, while at the same time increasing noise since actual temperature variation bandwidths are typically much lower than engine firing frequencies. Further, the appropriate time to sense temperature for each actuator may depend on the location of the valve coupled to the actuator, the type of valve coupled to the actuator, and/or whether the actuator opens, or closes, a valve. Further, from which actuator the temperature sensing is needed may vary with engine operation and the end use of the temperature information.

In one approach, the above issues may be addressed by a method of operation for an engine including an electrically actuated engine valve, with at least an actuator, the method comprising: applying a potential to generate a current in the actuator indicative of temperature at least partially during a substantially non-moving condition of the actuator; and adjusting a timing of the application of the potential based on valve location in the cylinder head or actuator type. The application of the potential may thus correspond to a resistance measurement. Further, the valve location may include a whether a valve is located in different cylinders, or located on the intake side versus the exhaust side. As another example, actuator type may include whether the valve actuator is an opening or closing actuator for the valve.

In this way, a temperature reading from among a plurality of actuator types and/or valve locations can be coordinated with engine firing and engine crankshaft rotation so that temperature sampling may be achieved among a plurality of actuators. Furthermore, the temperature reading may be achieved by adjusting the timing of the resistance measurement based on changes in engine firing order (e.g., due to cylinder deactivation), or changes in active valve operation and engine stroke (e.g., changing timing of a valve from operating during and intake stroke to during an exhaust stroke, or changing a number of strokes in a cycle, such as 6-stroke cycles).

BRIEF DESCRIPTION OF THE DRAWINGS

FIGS. 4-6 show various high level flowcharts of example operation.

DETAILED DESCRIPTION

Figure 1A:
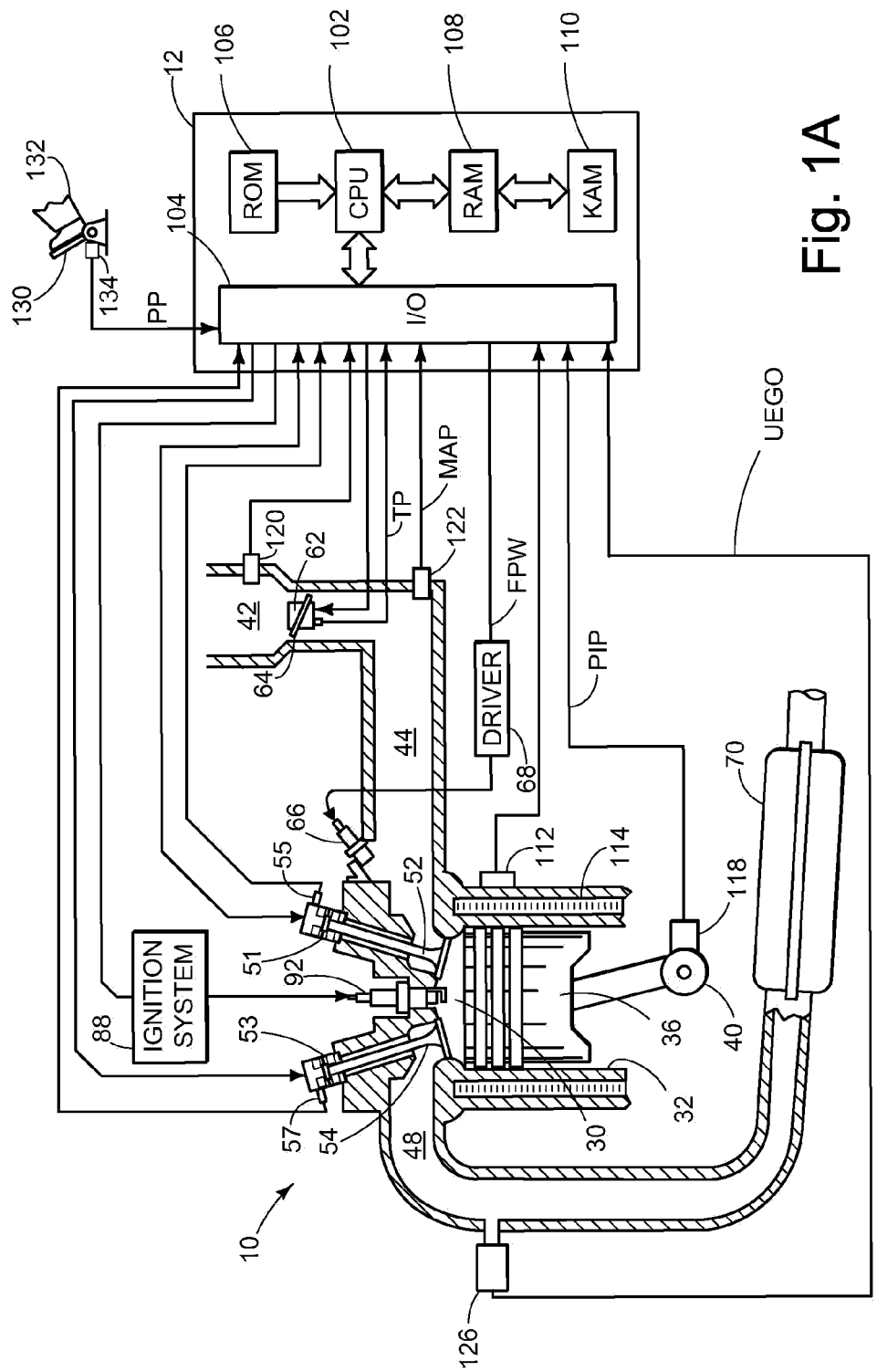
FIG. 1A is a schematic diagram of an engine system.

Referring now to FIG. 1A is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Figure 2A:
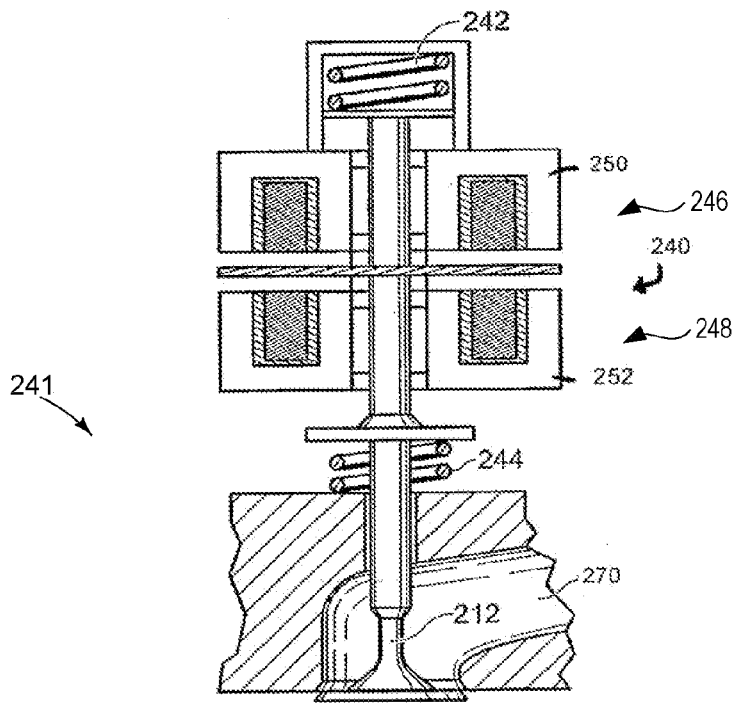
FIG. 2A is a schematic diagram of an engine valve coupled to a valve actuator system.

Intake valve 52 may be controlled by controller 12 via electric valve actuator (EVA) 51. Similarly, exhaust valve 54 may be controlled by controller 12 via EVA 53. During some conditions, controller 12 may vary the signals provided to actuators 51 and 53 to control the opening and closing of the respective intake and exhaust valves, such as shown in FIG. 2A. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown arranged in intake passage 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1A as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

As described above, FIG. 1A shows only one cylinder of a multi-cylinder engine, and that each cylinder may similarly include its own set of intake/exhaust valves, fuel injector, spark plug, etc.

Figure 1B:
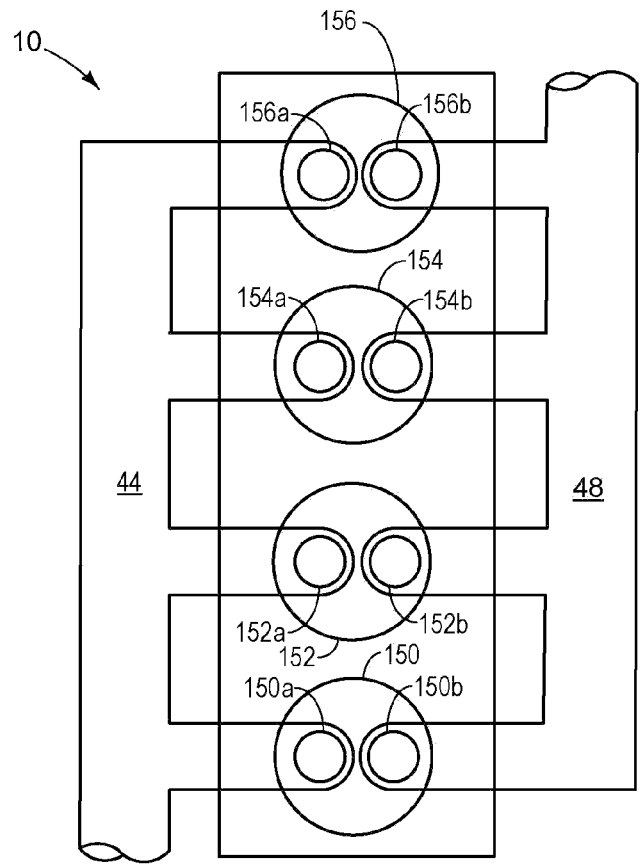
FIG. 1B is a schematic diagram of an engine block layout.

Referring now to FIG. 1B, engine 10 is shown as an example inline four-cylinder engine having each cylinder coupled to a common intake manifold 44 and a common exhaust manifold 48. While this example shows each cylinder coupled to common intake and exhaust manifolds, separate exhaust manifolds for one cylinder, or groups of cylinders, may be used, if desired.

Continuing with FIG. 1B, four cylinders 150, 152, 154, and 156 are shown in an inline configuration, although various other engine configurations and numbers of cylinders may be used, if desired. The engine may include a plurality of electrically actuated intake and/or exhaust valves. In this example each of cylinders 150-156 have two valves per cylinder, labeled a and b. In another example, the engine may include one electrically actuated valve in each cylinder or a plurality of electrically actuated valves in one or more cylinders. Thus, in this example, cylinder 150 has two valves, 150*a* and 150*b*. Likewise, cylinder 152 has two valves, 152*a* and 152*b*. Cylinder 154 has two valves, 154*a* and 154*b*. Cylinder 156 has two valves, 156*a* and 156*b*. While this example has two valves per cylinder, various other configurations may be used, such as, for example, three valves per cylinder, four valves per cylinder, or combinations thereof.

Furthermore, the engine may include a cylinder head that may be located on top of the cylinders, different cylinder head locations may include being located in the head of different cylinders, or at different location within the head of the same cylinder. In the case of the latter, different cylinder head locations may include intake vs. exhaust valve location i.e. intake side and exhaust side. Additionally, in the case of the latter it may also include left vs. right intake valve in the example of two intake valves per cylinder.

As shown by FIG. 1B, valves with subscript "a" are each in a common location in the cylinder. Likewise, valves with subscript "b" are each in a common location.

In the example of FIG. 1B, each cylinder valve may be electrically actuated without the use of a camshaft. Alternatively, some of the cylinder valves may be electrically actuated and some may be cam actuated. The cam actuated valves may have fixed cam timing, or may have variable cam timing. Further, the cam actuated valves may be mechanically deactivated, such as by deactivating a lifter or pushrod, for example.

FIG. 1B shows each cylinder in the engine having one valve coupled to an intake side of the engine and one valve coupled to an exhaust side of the engine b. As noted above, different numbers of valves may be used, for example two intake side valves and a single exhaust side valve. Further, as noted above, some valves, such as intake side valve, can be electrically actuated, while some valves, such as exhaust side valves, may be cam actuated.

FIG. 2A shows an example dual coil oscillating mass actuator assembly 240 with an engine valve 241 actuated by a pair of opposing electromagnets (solenoids) 250, 252, which are designed to overcome the force of a pair of opposing valve springs 242 and 244. Engine valve 241 and actuator assembly 240 may be used in the engine shown in FIGS. 1A and 1B. The electromagnets may include coils (not shown). An upper actuator 246 may contain the electromagnets 250. A lower actuator 248 may contain electromagnet 252. Springs 240 and 242 are coupled to an armature 212. The upper actuator may be a closing actuator (e.g. first actuator type) and the lower actuator may be an opening actuator (e.g. second actuator type). In this way there may be a first actuator type and a second actuator type. FIG. 2A also shows port 270, which can be an intake or exhaust port). Applying a variable voltage to the electromagnet's coil induces current to flow, which controls the force produced by each electromagnet. Due to the design illustrated, each electromagnet that makes up an actuator produces force in one direction, independent of the polarity of the current in its coil. High performance control and efficient generation of the required variable voltage can therefore be achieved by using a switch-mode power electronic converter. Alternatively, electromagnets with permanent magnets may be used that can be attracted or repelled. Further still, other electrically actuated valve systems may be used.

As illustrated above, the electromechanically actuated valves in the engine may remain in a half, or partially, open neutral position when the actuators are de-energized. Therefore, prior to engine combustion operation, each valve goes through an initialization cycle. During the initialization period, the actuators are pulsed with current, in a prescribed manner, in order to establish the valves in the fully closed or fully open position. Following this initialization, the valves are sequentially actuated according to the desired valve timing (and firing order) by the pair of electromagnets, one for pulling the valve open (lower) and the other for pulling the valve closed (upper).

The magnetic properties of each electromagnet are such that only a single electromagnet (upper or lower) need be energized at any time. Since the upper electromagnets hold the valves closed for the majority of each engine cycle, they are operated for a higher percentage of time than that of the lower (opening) electromagnets. However, in an alternative example, single coil valve actuators may be used.

While FIG. 2A shows the valves to be permanently attached to the actuators, in practice there can be a gap to accommodate actuator and valve thermal expansion.

Figure 2B:
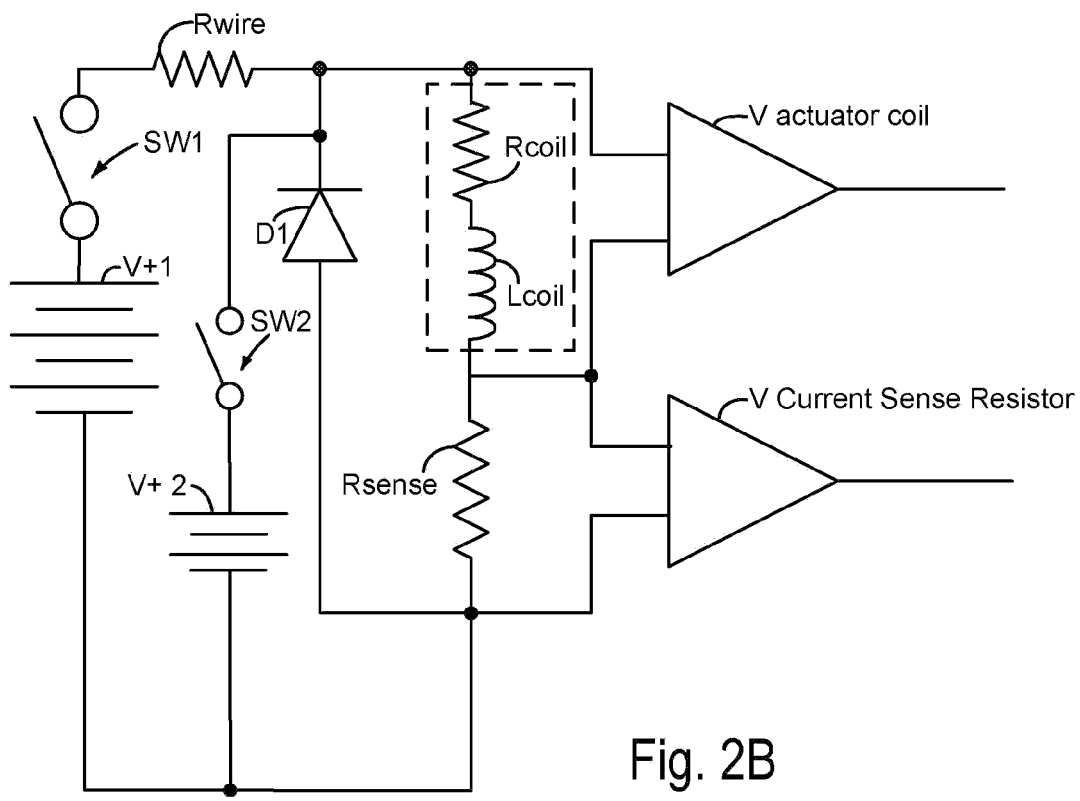
FIG. 2B is a representation of a circuit diagram including a valve actuator.

Referring now to FIG. 2B, a schematic circuit diagram is shown. While this figure shows a single circuit for a single coil, each coil may have a corresponding circuit, or combination circuits may be used for more than one coil.

FIG. 2B shows a circuit diagram that may be used to control a solenoid, as well as measure the current applied to a coil. For example the circuit may be electronically coupled to actuator 250 or 252, shown in FIG. 2A. The circuit is configured to pass a current, such as via an applied potential, through an actuator coil during an interval where valve actuation is not needed, described in more detail herein. The potential applied to the actuator coil may be during a substantially non-moving valve condition, such as when the valve is held open, closed, or left in the neutral position. The measured value of the holding current can then be correlated to the temperature of the valve and thereby the temperature of the associated cylinder. Note that alternative circuit configurations may be used. For example, a single battery and switch system may be used.

In one example, the holding current, such as the holding current to maintain the valve open, closed, etc., may be used to correlate to temperature. However, in some examples, valves may utilize permanent magnets to provide self-latching operation, where the valve may be held open/closed without requiring a holding current. However, when temperature sensing is desired, a small potential may be applied to generate a small current, which can then be used to correlate temperature. In some examples the current may be 5 amps. Further, the small current may be applied to the circuit and therefore the coil resistance can be correlated to coil temperature. The coil temperature is in turn correlated with valve temperature, actuator magnetic properties, valve length, actuator length, and position sensor performance; all of which can relate to control performance. In other examples, a small current may be applied to the circuit and the resistance of the wire may be measured. The resistance of the wire can then be correlated to the temperature of the specific actuator and therefore the associated valve. In this way, more efficient valve operation may be achieved, yet when desired, temperature sensing may also be provided. The circuit includes a main switch SW1, a secondary switch SW2, an actuator coil Lcoil with an internal resistance Rcoil, a higher voltage power supply V+1 and a lower voltage power supply V+2, a wire or wires with a current sense resistance Rsense, a wire with a resistance Rwire, a diode D1, V actuator coil, and a V current sense resistor.

While current is being delivered to the actuator coil, to actuate a solenoid, main switch SW1 is closed and secondary switch SW2 is open. In this way current may be delivered to the actuator coil when the engine requires actuation of a valve associated with a cylinder in the engine. The actuation of the valve allows the valve to remain open or closed while the current is being delivered to the actuator coil.

On the other hand, while actuation of a valve is not required, the circuit may be configured to detect the resistance of the circuit. For example, SW1 is opened and SW2 may be closed when the coil current has decayed to an appropriate level. Then the voltage across Rsense is measured and the measured value is correlated with the temperature of the actuator. The variation of current that passes through the coil with time according to such operation is further illustrated in FIG. 2C.

Figure 2C:
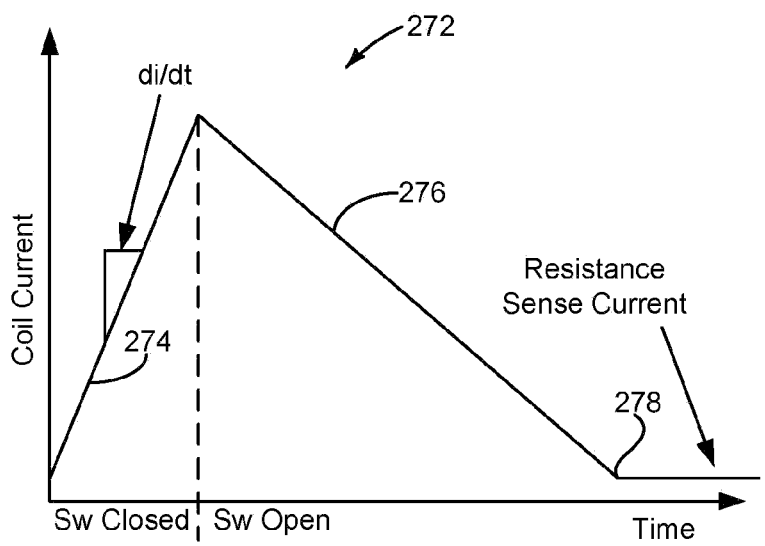
FIG. 2C is a graphical representation of the current versus time passing through the coil shown in FIG. 2B.

As shown in FIG. 2C the coil current is on the y axis and time is on the x axis. Furthermore, the current through the coil represented by line 272 increases linearly 274 when main switch SW1 is closed. On the other hand, when main switch SW1 is opened the current through the coil, represented by line 276, linearly decreases. At 278 the current through the coil reaches an appropriate level, secondary switch SW2 is closed and a low voltage is supplied by the lower voltage power supply V+2 and the current remains approximately constant. In this way, the resistance through the current sense resistor Rsense can be measured. The resistance of the current sense resistor may then be correlated to the temperature of the associated valve and/or cylinder, described in more detail herein.

One example operation is now described illustrating example temperature identification. Specifically, if a small dc current were being passed through a coil that is not being actuated, the following equation may hold when the armature is not moving:

$$V_{bat} = i1 * (Rwire + Rcoil + Rsense) + Lcoil * \frac{di}{dt} + N * \frac{\partial \varphi}{\partial t} \quad (1)$$

where, $V_{bat}$ is the supply voltage, i1 is the current flow from the higher voltage power supply V+1, Lcoil is the coil inductance, and N is the number of turns in the coil.

$$\varphi = u*N*i \quad (2)$$

u is the permeability of the material that the flux is passing through. In this example the material is iron. di/dt=0 for a dc case (any change in the value of the voltage across the coil, V actuator coil, would be due to the $$N * \frac{\partial \varphi}{\partial t}$$

term). This term is directly related to the velocity of the armature during its transition from closed to open and could be used for controlling the valve transition time and other attributes. Equation 1 may be used when the armature is not moving. In other examples, other suitable equations may be used to determine the voltage across the coil when the armature is moving.

Figure 5:
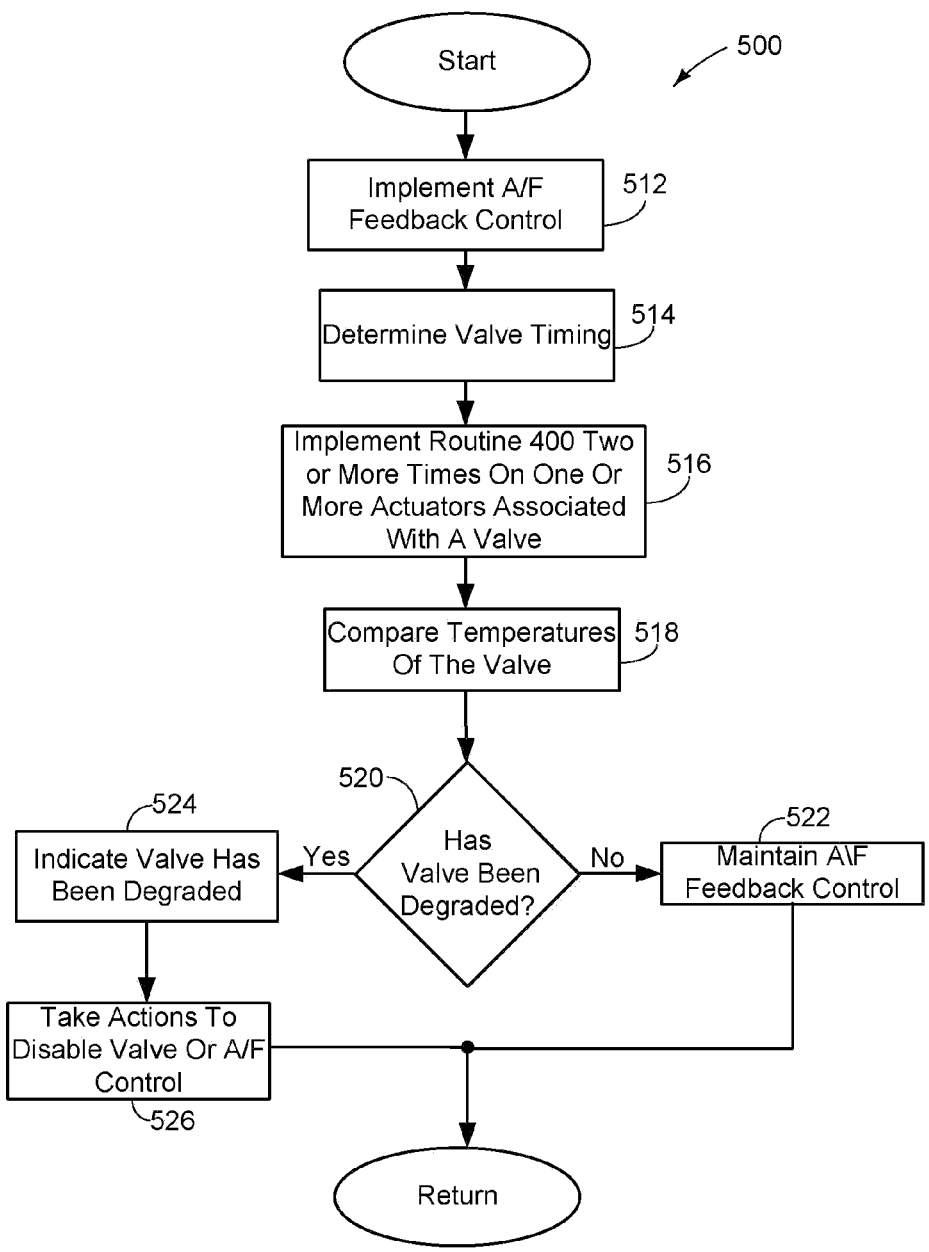

Additionally, within each valve actuator, and across all valve actuators, the measurement of the coil resistances can provide prognostic information. For example, if a coil begins to degrade and have its resistance increase or decrease due to this degradation an unexpected change in the coil resistance, short term or long term, relative to the other actuator coils could be detected and used for further diagnostics, such as valve deactivation, setting of a diagnostic code, etc. A method that may be employed to detect valve degradation is shown in FIG. 5.

Further still, in any solenoid type actuator there may be stray lines of flux that may pass beyond the actuator and should be expected to pass into a steel valve stem. The amount of flux that will pass through the steel valve stem can depend on its permeability which can vary with temperature. Selective sampling of current waveforms from one of the actuator coils, in combination with placement of a third coil, may provide valve temperature for used by the engine controller.

Figure 2D:
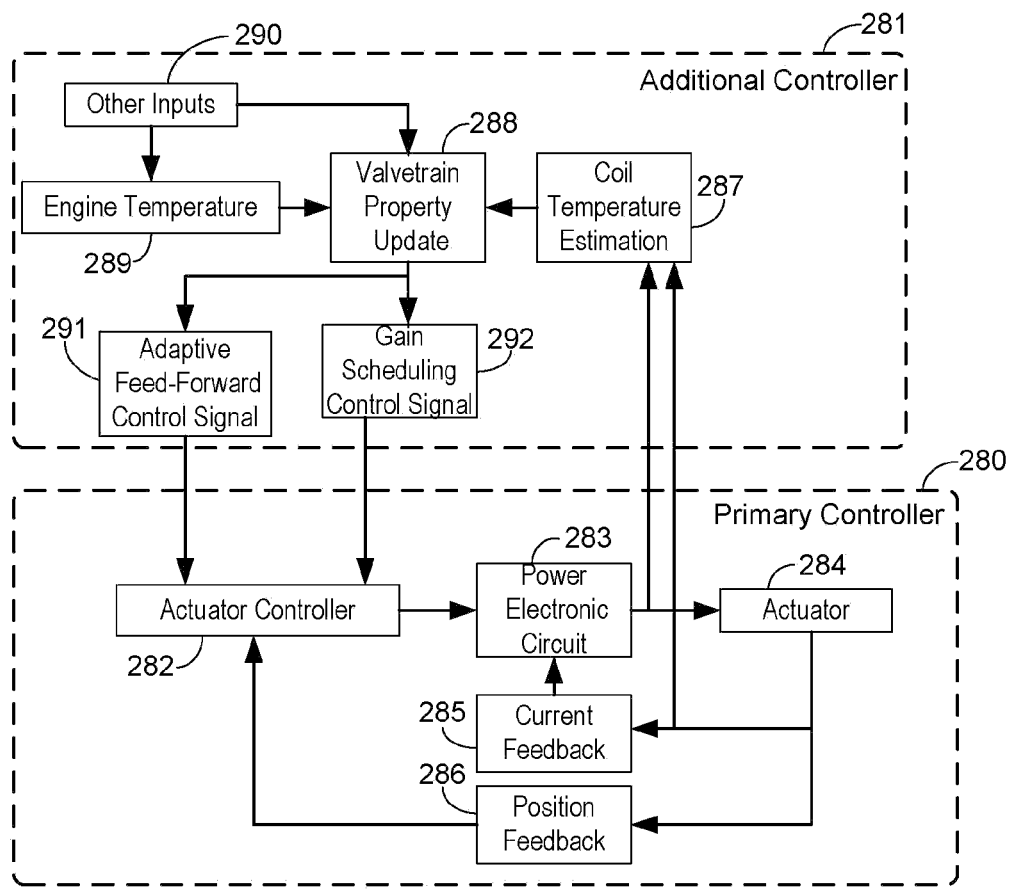
FIG. 2D is a diagram of a control system.

FIG. 2D depicts an interaction that may occur between a primary controller 280 and an additional controller 281. In this example, the primary controller may be controller 12. However, in another example, the primary controller may be another suitable controller.

The primary controller, among other functions, may perform valve actuator feedback control. Utilizing feedback control allows for accurate control of the valves under a variety of engine operating conditions. The primary controller may include an actuator controller 282. The actuator controller may send a signal to power the electronic circuit 283 of an actuator 284. In one example the circuit shown in FIG. 2B may be used to activate the actuator. A sensor (not shown) may be coupled to the actuator. The sensor may be able to provide a current feedback response 285 and a position feedback response 286. The current feedback may alter the signal that is sent to the actuator from the electronic circuit. The position feedback may adjust the signal produced by the actuator controller that is sent to power the electronics.

The additional controller 281 may be used to provide a feed-forward predictive control signal to the actuator to increase the accuracy of actuation. The feed-forward control strategy works in conjunction with the feedback control strategy to increase the accuracy of valve actuation. The additional controller may use the power electronics signal sent the actuator and the current feedback signal in the primary controller for a coil temperature estimation 287. One or more updated valvetrain properties 288 may be updated based on the estimated coil temperature 287, an engine temperature 289, and other inputs 290 that may include various engine parameters such as manifold air pressure, ignition timing etc. The updated valvetrain properties may then be used to generate an adaptive feed-forward control signal 291 and a gain scheduling control signal 292. The adaptive feed-forward control and gain scheduling signal may be sent to actuator controller 282 located in the primary controller to increase the accuracy of valve actuation with a predictive control strategy.

Referring to FIGS. 3A-D, the valves in the engine may be controlled relative to the crank angle. The figures shows example exhaust and intake opening and closing events for the expansion, exhaust, intake and compression cycles of a 4-cylinder engine operating with a 4-stroke cylinder cycle. The crank angle is on the x-axis and the actuation current delivered to the valve is on the y-axis. The type of valves and actuators used in each cylinder shown in FIGS. 3A-3D may be similar to the valve shown in FIG. 2A.

Specifically FIG. 3A-3D illustrates how valve actuation with dual actuator coils may be implemented in an engine with an inline-4 configuration, shown in FIG. 1B. Furthermore, the movement timing of the various actuators may be deduced from the various timing diagrams shown in FIGS. 3A-3D. Alternate engine configurations may be used, such as a V-4 or a horizontally opposed 4-cylinder engine, as well as alternative timing diagrams.

As noted, the valve actuator may have durations where one of, or both, the opening (i.e. upper actuator coil) or closing coil (i.e. lower actuator coil) is not actuated to open/close the valve. In such cases, there are durations where a coil is not activated and a low frequency component of the current, di/dt=0, can be passed through the non activated coil for the purposes of measuring the coil resistance i.e. apply a potential. For the example, in FIG. 3A, during Interval A1 where the exhaust closing coil is off, a low frequency component of the current may be applied to the coil so the voltage drop across the coil could be measured and the resistance of the coil calculated. The current applied to the coil may hold the actuator in a substantially non-moving condition. From the changing resistance from the coils room temperature resistance the coil temperature can be determined:

$$T_{coil} = (R_{coil} - R_{20° C.})/(R_{20° C.} * \alpha) + 20° C. \quad (3)$$

Where Tcoil is the present temperature of the coil, Rcoil is the present resistance of the coil, R20° C. is the room temperature measurement of the coil and $\alpha$ is the thermal resistivity of the coil wire (for copper $\alpha$=0.00393/C. deg).

FIG. 3A-FIG. 3D shows timing diagrams for the intake and exhaust valves of cylinders 150, 154, 156, and 152 respectively. The crank angle is shown on the x axis and the current delivered to specified actuator coils is on the y axis. The timing diagrams may be used to adjust a timing of the application of a potential to the actuator based on a valve location in the cylinder head. In other examples, the timing diagrams may be adjusted to allow for detection of the temperature of an actuator and/or a cylinder during specific time periods.

Figure 3A:
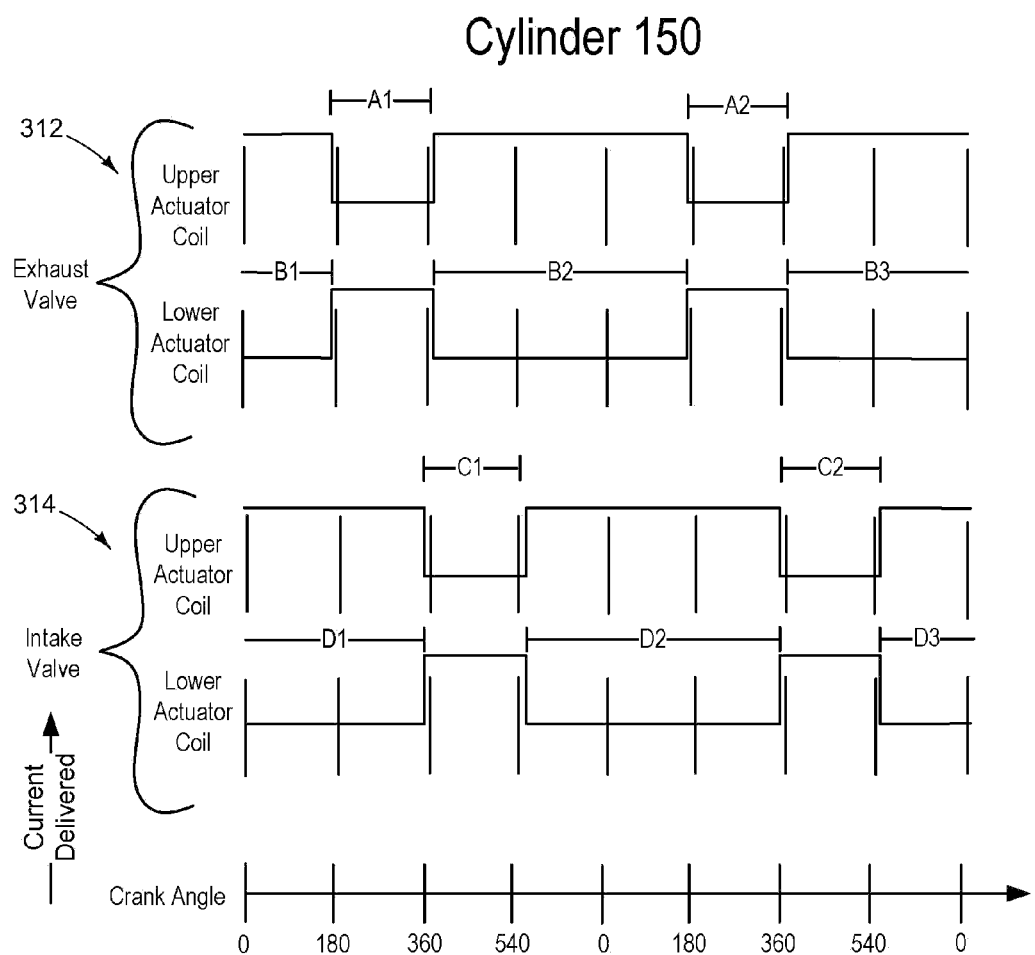
FIGS. 3A-3D show timing diagrams of engine valve actuator positions of various engine cylinders.

As shown in FIG. 3A, timing diagrams 312 and 314 shows the timing of the exhaust valve and intake valve actuation of cylinder 150, shown in FIG. 1B. In this example, each valve includes an upper actuator coil and a lower actuator coil. The actuator coils may be similar to the coils used in the actuators shown in FIG. 2A. In other examples, different actuator configurations may be used that allow the valve to open and close in response to electrical or mechanical inputs. Furthermore, when the upper actuator coil is energized the lower actuator coil is not energized, closing the valve, allowing the valve to seat and seal. On the other hand, when the upper actuator coil is not energized and the lower actuator coil is energized and the valve is open, allowing fluid to travel downstream of the valve. It can be appreciated by someone skilled in the art that other suitable actuator configurations may be utilized. For example, the valve may contain a single actuator with a spring return, as opposed to an upper and a lower actuator coil. However, when a solenoid containing an upper and a lower actuator coil is utilized, the duration of time during which the temperature of the actuator can be measured is substantially increased due to the characteristics of the actuators.

Again referring to FIG. 3A, A1 and A2 represent the time intervals during which the coil resistance and therefore temperature of the upper actuator coil of the exhaust valve may be measured. B1, B2, and B3, represent the time interval during which the temperature of the lower actuator coil of the exhaust valve may be measured. C1 and C2 represent the time intervals during which the temperature of the upper actuator coil of the intake valve may be measured. D1, D2, and D3 represent the time intervals during which the temperature of the lower actuator coil of the intake valve may be measured.

Figure 3B:
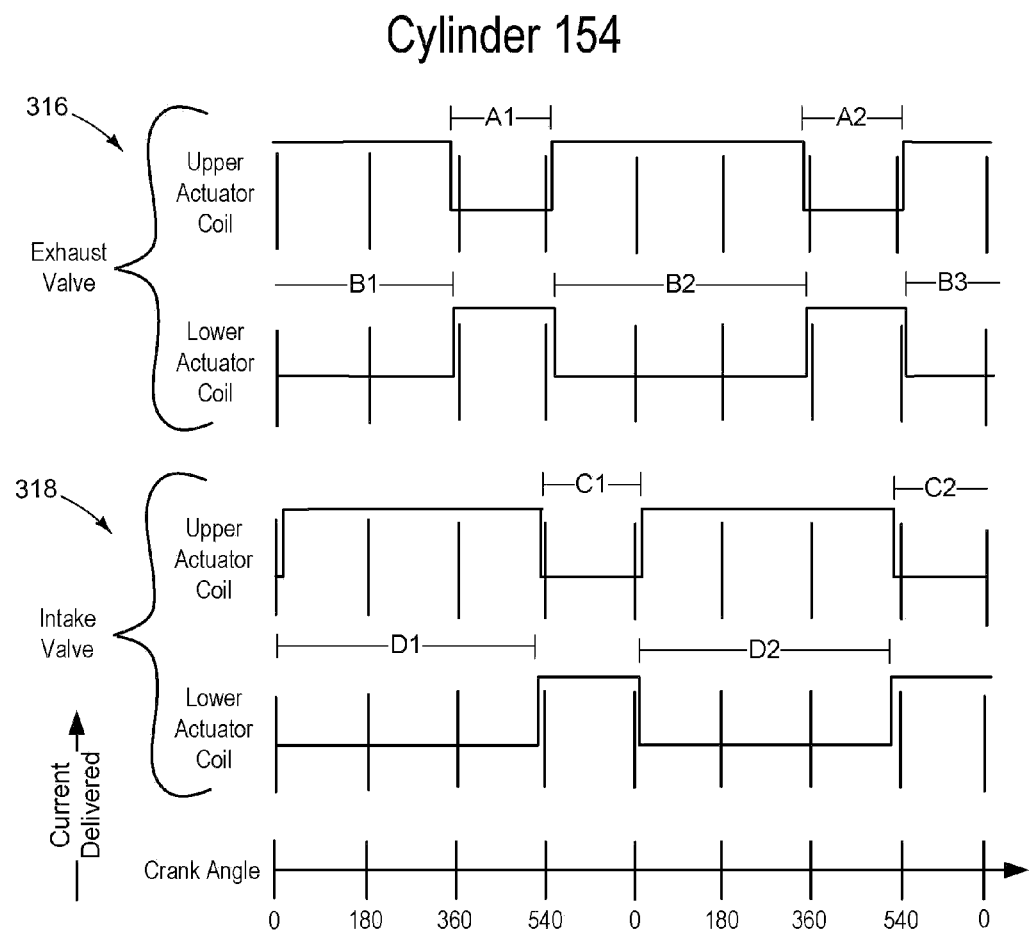
Figure 3C:
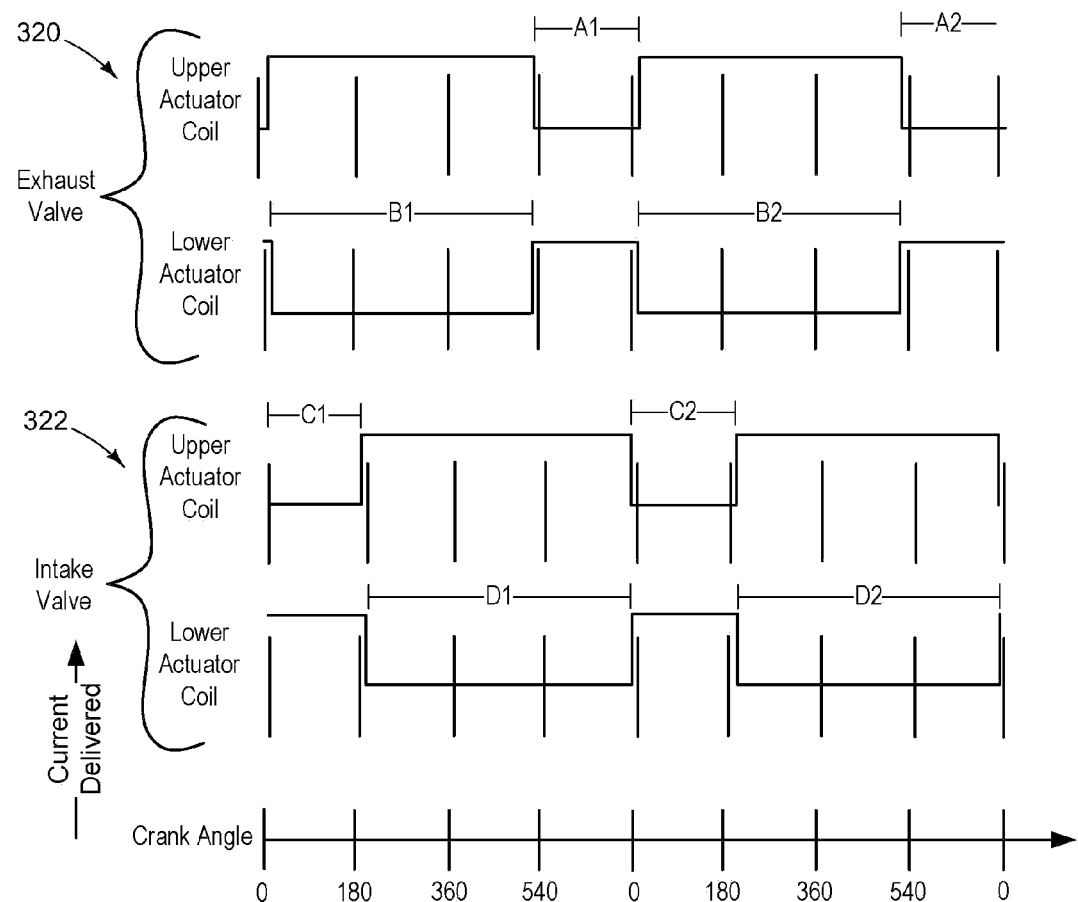
Figure 3D:
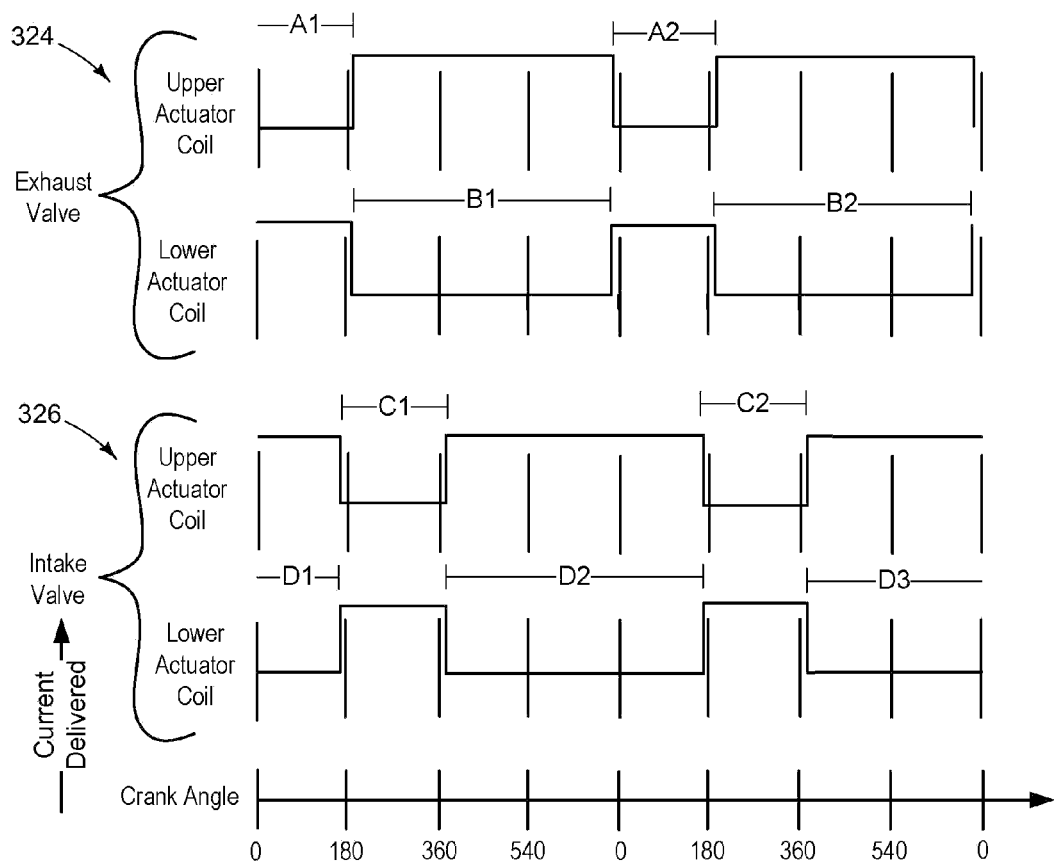

Now referring to FIG. 3B, timing diagrams are shown for the intake and exhaust valves of cylinder 154. The timing of actuation of the actuators associated with the intake and exhaust valve is different than FIG. 3A, however the time intervals during which the temperature of the actuator can be measured have similar labeling to FIG. 3A. Furthermore, timing diagrams 316 and 318 shows the timing of intake and exhaust valve for both the upper actuator coil and the lower actuator coil. Time intervals labeled A1-A2 indicates the time at which the temperature of the upper actuator coil of the exhaust valve may be measured. B1-B3 indicate the time interval at which the temperature of the lower actuator coil of the exhaust valve may be measured. C1-C2 indicate the time interval at which the temperature of the upper actuator coil of the intake valve may be measured. D1-D2 indicate the time intervals at which the temperature of the lower actuator coil of the intake valve may be measured. FIG. 3C and FIG. 3D are similarly labeled.

FIG. 3C and FIG. 3D show timing diagrams for cylinder 156 and the cylinder 152, respectively. The valve actuation timing is dissimilar. However, the time intervals during which the temperature of the actuator(s) may be measured, shown in FIG. 3C and FIG. 3D, have labels corresponding to the time intervals during which the temperature of the actuator(s) may be measured shown in FIG. 3A and FIG. 3B, i.e. similar time intervals are labeled accordingly. For example the time intervals during which the temperature of the upper actuator coils of the exhaust valve may be measured are labeled A1-A2 for cylinder 156 and cylinder 152.

The specific intervals (e.g., crank angle window) during which the resistance of the actuator coil can be measured may be performed during the same interval (crank angle window) or may occur during subsequent time intervals. For example as shown in FIG. 3A, the time interval A1, near 180-360 crank angle degrees, may occur during the same or subsequent crankshaft rotations as time interval A2, near 180-360 crank angle degrees. Likewise samples taken at for different actuator may be used. For example, may sample near 240 crank angle degrees for A1, and 360 crank angle degrees (of the same or subsequent crankshaft rotations) for B2.

FIG. 4 shows a routine 400 that may be implemented to measure the temperature of the coil in an actuator and therefore the temperature of an individual valve and/or cylinder associated with the actuator. The valves and actuators discussed in the description of FIG. 4 may be similar to the valve and actuators shown in FIG. 2A. Determining the temperature of a specific valve and/or cylinder may increase the accuracy of the fuel injection system, increasing the efficiency of the engine. The routine shown in FIG. 4 may be implemented during time intervals when valve actuation is not needed. The specific time intervals during which valve actuation is not needed are shown in FIG. 3A-FIG. 3D.

At 412 the valve and actuator used for temperature sensing is selected. The selection may be carried out by a Valve Control Unit VCU or a Powertrain Control Module PCM through a Computer Area Network CAN. The routine then proceeds to 414, where the actuator sensing window is determined based on firing order, number of operating strokes, valve timing, number of strokes per combustion cycle, cylinder mode (activated or deactivated), etc. The routine then advances to 416, where the main switch SW1 in the valve actuation circuit shown in FIG. 2B, is opened and the secondary switch SW2 is closed.

The routine the proceeds to 418, where it is determined if di/dt=0 in the circuit, shown in FIG. 2B. A non-moving condition of the actuator may include interval of time when di/dt=0 in the circuit, shown in FIG. 2B. The non-moving condition of the actuator may further include when the valve is at pole face, valve held open, valve held closed, valve levitated at partially open position, etc. If di/dt does not equal zero then the routine may wait for a predetermined period of time and repeat step 418. On the other hand, if it is determined that di/dt equal zero or is substantially zero the routine proceeds to 420 where a potential is applied to the actuator circuit, shown in FIG. 2B, to generate a current in the actuator. In this example, a small voltage is applied the circuit and the resistance across Rsense. As described herein, the application of a potential, such as a voltage, to the actuator coil may be timed to engine operation, and in particular timed according to a valve position (location) in the cylinder head, and an actuator type coupled to the valve. In particular the potential may only be applied to the actuator during the time intervals (crank angle windows) shown in FIG. 3A-3D. In one example the timing of the potential delivered to the actuator may be adjusted responsive to whether the electrically actuated engine valve is an intake valve or a cylinder head location. In this way a potential may be applied at a crankshaft timing.

The routine then advances to 422, where the voltage across the coil and current limit resistor in the actuator circuit is measured. The routine then proceeds to 424, where the actuator coil temperature is calculated and the information is sent on the control area network CAN. In this way the coil temperature and therefore the actuator temperature may be indicated. After 426 the routine may return to the start where the routine may be carried out on a different cylinder in the engine. The routine may be repeated where the timing of the subsequent potential delivered to a second actuator may be adjusted based on a difference between the cylinder head location of the second actuator compared to the cylinder head location of the first actuator or based on actuator type. In this example, the first actuator may be coupled in a first cylinder and the second actuator may be coupled in a second actuator. In other examples, the routine may be repeated on the same cylinder and/or valve in the engine. A series of temperature measurements may then be compared from the same cylinder or valve, and from the aforementioned comparison valve degradation may be determined. In other examples the routine may end after 426.

FIG. 5 depicts a routine 500 that may be implemented to determine if degradation of one or more of the cylinders has occurred. The routine may be implemented after the temperature of two or more cylinders has been determined by the method depicted in FIG. 4.

At 512 air fuel A/F feedback control is implemented. The routine then advances to 514, where the valve timing is determined. In some examples the valve timing may be adjusted to provide a greater or smaller crank angle window for the temperature of the valves to be calculated. The routine then proceeds to 516, where routine 400 may be implemented two or more times for one or more actuator(s) associated with a valve. In this way a history of temperatures may be determined for a valve. In other examples routine 400 may be implemented two or more times for one or more actuators associated with different valves and/or cylinders. Then the routine advances to 518, where the two or more temperatures of the valve are compared. In other examples, two or more temperatures of different cylinders or valves may be compared.

At 520 it is determined if the one of the valves has been degraded based on whether the temperatures differ by more than a selected amount, which may depend on whether the temperature of the valve is outside a predetermined range, or if the difference between the valve temperatures is greater than a predetermined value. In other examples, the temperature of different valves may be compared and degradation of a valve may depend on whether the temperature of one valve is higher or lower than that of another valve. If it is determined that the valve has not been degraded the routine proceeds to 522 where air fuel A/F feedback control is maintained. After 522 the routine may return to the start. In other examples, the routine may end after 522.

However, if it is determined that the valve has been degraded the routine proceeds to 524 where an indication is made that the valve has been degraded. The indication may be carried out by a suitable controller located in the vehicle. The routine then advances to 526 where actions are taken to mitigate the effects of the degraded valve. The aforementioned actions may include: disabling the cylinder associated with the valve, altering the injection profile associated with the cylinder, disabling air fuel feedback control, and/or discontinuing operation of the engine. After 526 the routine may return to the start. In other examples, the routine may end after 526.

FIG. 6 shows a routine 600 that may be implemented to determine the injection profile. This may be used as an adaptive feed-forward control as opposed to air fuel feedback control. The implementation of a feed-forward control mechanism allows for increased accuracy of the fuel injection system.

At 612 it is determined if the engine is in warm up. If the engine is not in warm up, the routine returns to the start. In other examples, the routine may end if the engine is not in warm up. However, if the engine is in warm up the routine proceeds to 614 where routine 400 is implemented two or more times. Routine 400 may be implemented several times for a number of different cylinders. The routine then proceeds to 616, where the temperature of the valve and/or actuator is determined. The coil temperature measured in method 400 may directly correspond to the actuator and/or cylinder temperature. Alternatively, the coil temperature measured in method 400 may be used as a parameter when determining the cylinder temperature.

The routine then advances to 618, where the viscosity of the fuel is determined. The viscosity of the fuel may be determined based on various parameters, which may include: cylinder temperature, fuel composition, valve temperature, fuel pressure, etc.

The routine then proceeds to 620, where the injection timing and/or profile is adjusted, based on the viscosity of the fuel determined in step 618. After 618 the routine returns to the start where the routine may be repeated for another cylinder and/or actuator.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operation for an engine including an electrically actuated engine valve in a cylinder head, with at least an actuator coupled to the valve, the method comprising:
   applying a potential to generate a current indicative of temperature in the actuator at least partially during a substantially non-moving condition of the actuator;
   adjusting a timing of the application of the potential based on valve location in the cylinder head.

2. The method of claim 1 where the timing is adjusted responsive to whether the electrically actuated engine valve is an intake valve, where the applied potential generates a corresponding current correlated to temperature and where said applied potential does not move the actuator.

3. The method of claim 1 where the timing is adjusted responsive to whether the electrically actuated engine valve is an intake valve.

4. The method of claim 1 where the valve is coupled in a cylinder of the engine, and the timing is adjusted responsive to a cylinder location in the cylinder head.

5. A method of operation for an engine including a plurality of electrically actuated engine valves, each with at least an actuator, the method comprising:
   applying a first potential to generate a first current in a first actuator at least partially during a substantially non-moving condition of the first actuator, where the first potential is applied at a first crankshaft timing;
   applying a second potential to generate a second current in a second, different, actuator at least partially during a substantially non-moving condition of the second actuator; and
   adjusting a timing of application of the second potential to be different from the first based on a difference between a cylinder head location of the second actuator compared to a cylinder head location of the first actuator or based on an actuator type.

6. The method of claim 5 further comprising providing first and second temperature indications respectively based on the first and second currents.

7. The method of claim 6 where the different cylinder head location includes the first actuator being coupled to an intake valve and the second actuator being coupled to an exhaust valve.

8. The method of claim 6 where the different cylinder head location includes the first actuator being coupled in a first cylinder and the second actuator coupled in a second cylinder.

9. The method of claim 6 where the different actuator type include the first actuator being an opening actuator and the second actuator being a closing actuator.

10. The method of claim 6 where the timing is adjusted responsive to both cylinder head location and actuator type, and where the different cylinder head location includes the first actuator being coupled to an intake valve and the second actuator being coupled to an exhaust valve, and further includes the first actuator being coupled in a first cylinder and the second actuator coupled in a second cylinder, and where the different actuator type include the first actuator being an opening actuator and the second actuator being a closing actuator, such that the timing adjustment accounts for each of the differences in cylinder head locations and actuator type in generating the temperature indications.

11. The method of claim 6 where the timing may further be adjusted responsive to a difference in movement timing of the first valve and second actuator.

12. The method of claim 6 further comprising adjusting movement of the first and second actuators responsive to the temperature indications.

13. The method of claim 6 further comprising determining degradation of at least one of the first and second actuator responsive to the temperature indications.

14. The method of claim 6 where the timing may further be adjusted responsive to changes in engine firing order.

15. The method of claim 6 where the timing may further be adjusted responsive to cylinder activation and/or deactivation.

16. The method of claim 6 where the timing may further be adjusted responsive to a number of strokes per combustion cycle.

17. A method of operation for an engine including a plurality of electrically actuated engine valves, each with at least an actuator, the method comprising:
   applying a first potential to generate a first current in a first actuator at least partially during a substantially non-moving condition of the first actuator, where the first potential is applied at a first crankshaft timing;
   applying a second potential to generate a second current in a second, different, actuator at least partially during a substantially non-moving condition of the second actuator;
   adjusting a timing of application of the second potential to be different from the first based on a difference between cylinder head location of the second actuator compared to cylinder head location of the first actuator and based on an actuator type; and
   providing first and second temperature indications respectively based on the first and second currents.

18. The method of claim 17 where the different cylinder head location includes the first actuator being coupled to an intake valve and the second actuator being coupled to an exhaust valve.

19. The method of claim 17 where the different cylinder head location includes the first actuator being coupled in a first cylinder and the second actuator coupled in a second cylinder.

20. The method of claim 17 where the different actuator type include the first actuator being an opening actuator including a permanent magnet and the second actuator being a closing actuator including a permanent magnet.

* * * * *